HIGH ACCURACY ELECTRONIC FUNCTION GENERATOR

Filed July 16, 1965 2 Sheets-Sheet 1

INVENTOR
BENITO L. POLO
BY White & Haefliger
ATTORNEYS.

Feb. 27, 1968 B. L. POLO 3,371,224

HIGH ACCURACY ELECTRONIC FUNCTION GENERATOR

Filed July 16, 1965 2 Sheets-Sheet 2

INVENTOR.
BENITO L. POLO
By White & Haefliger
ATTORNEYS.

United States Patent Office 3,371,224

Patented Feb. 27, 1968

3,371,224

HIGH ACCURACY ELECTRONIC FUNCTION GENERATOR

Benito L. Polo, Downey, Calif., assignor to Astrodata, Inc., Anaheim, Calif., a corporation of California Filed July 16, 1965, Ser. No. 472,630

3 Claims. (Cl. 307—229)

ABSTRACT OF THE DISCLOSURE

The disclosure concerns a function generator employing diodes and resistors and characterized in that it allows stretching of straight line segment break-point rounding characteristics over much wider input voltage ranges, with resultant much closer fitting of the function generator output to the ideal function for a given number of diodes used.

This invention relates generally to function generation, and more particularly concerns improvements in function generators employing biased diodes.

Diode function generators are devices that operate to sum the output currents of a number of channels, to generate straight line segments approximating selected functions, such operation being made possible due to the broken-line transfer characteristics of resistive networks containing biased diodes. Electronic analog computers commonly employ diode function generators to produce functions of an input variable.

Among the problems to be reckoned with in employing conventional diode function generators is that of insufficiently close matching of the function generator output to the ideal function desired. Mismatch error may be roughly considered as the deviation between the ideal function and the straight line segments generated by the function generator. To overcome this problem, it has previously been thought necessary to increase the number of diodes so as to provide an increased number of shortened line segments for a better fit to the ideal function; however, this expedient is costly, and it increases the number of components and complexity of the equipment.

It is a major object of the present invention to provide a function generator characterized by unusually advantageous structure, mode of operation and results, particularly in that it allows stretching of straight line segment break-point rounding characteristics over much wider input voltage ranges. As a result, much closer fitting of the function generator output to the ideal function may be obtained, with the same number of diodes, or alternatively, fewer diodes are needed to obtain any desired fit, as compared with prior systems.

Basically, the above objects and advantages are provided in a function generator that includes terminal means at which different biasing voltages are impressed, resistance connected in series in an input path to a reference point (typically at ground potential such as the input to an operational amplifier) and diode means connected between the terminal means and resistance sections of said input path. Typically, the diode means includes at least one or more diodes respectively connected between different bias voltage terminals of the terminal means and resistance spaced points of the input path.

More specifically, the input circuit means may include primary resistance in the form of a voltage divider, secondary resistance connected in series in an input path to the reference point, and diodes respectively connected between resistance spaced points of the input voltage divide and resistance spaced points of the input resistance path.

These and other objects and advantages of the invention, as well as the details of illustrative embodiments, will be more fully understood from the following detailed description of the drawings, in which:

FIG. 1 is a circuit diagram showing a function generator that suffers from the disadvantages described above;

FIG. 2*a* illustrates mismatch between an ideal function to be generated and the straight line segments approximately generated by the FIG. 1 equipment, FIG. 2*b* showing error associated therewith;

Figures 2A, 2B, 5A, 5B:
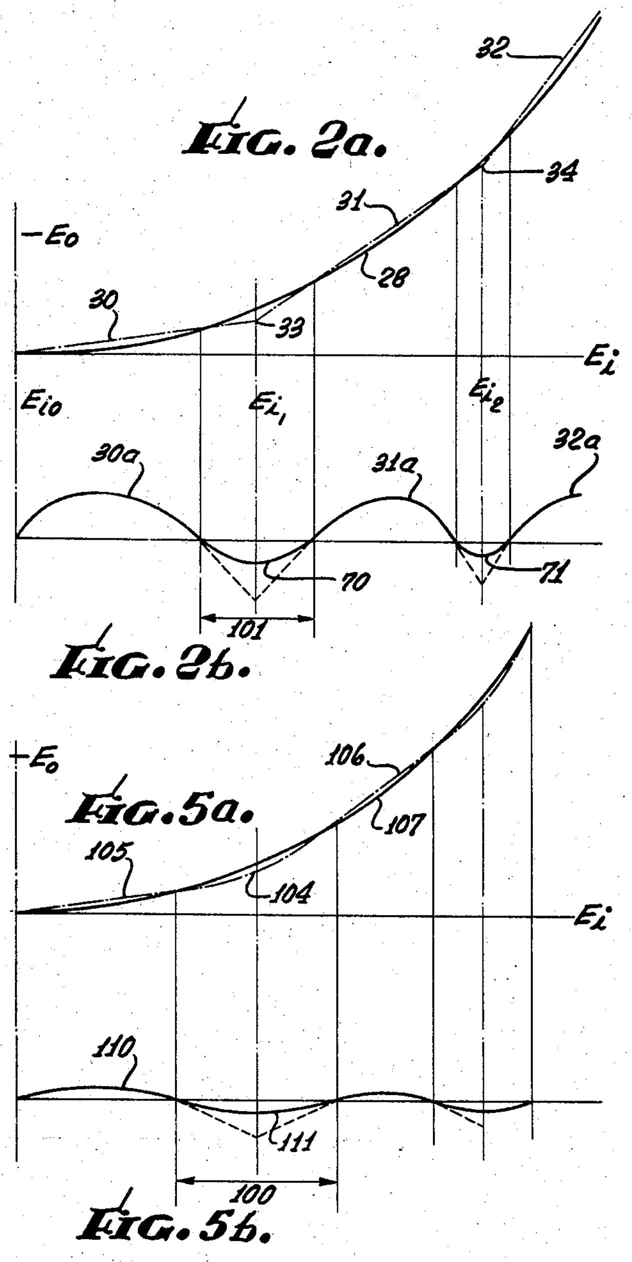
Figure 4:
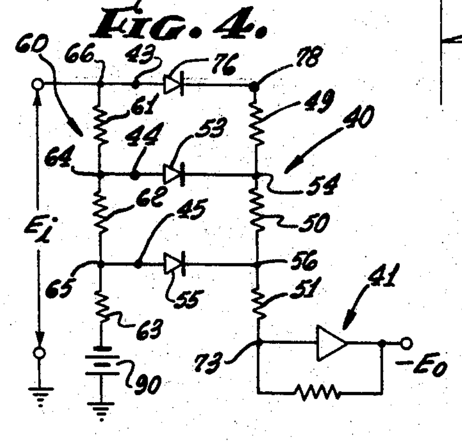
FIG. 4 shows an improved function generator of FIG. 3 type, wherein a voltage divider provides input voltage to the diode channels.
Figure 6:
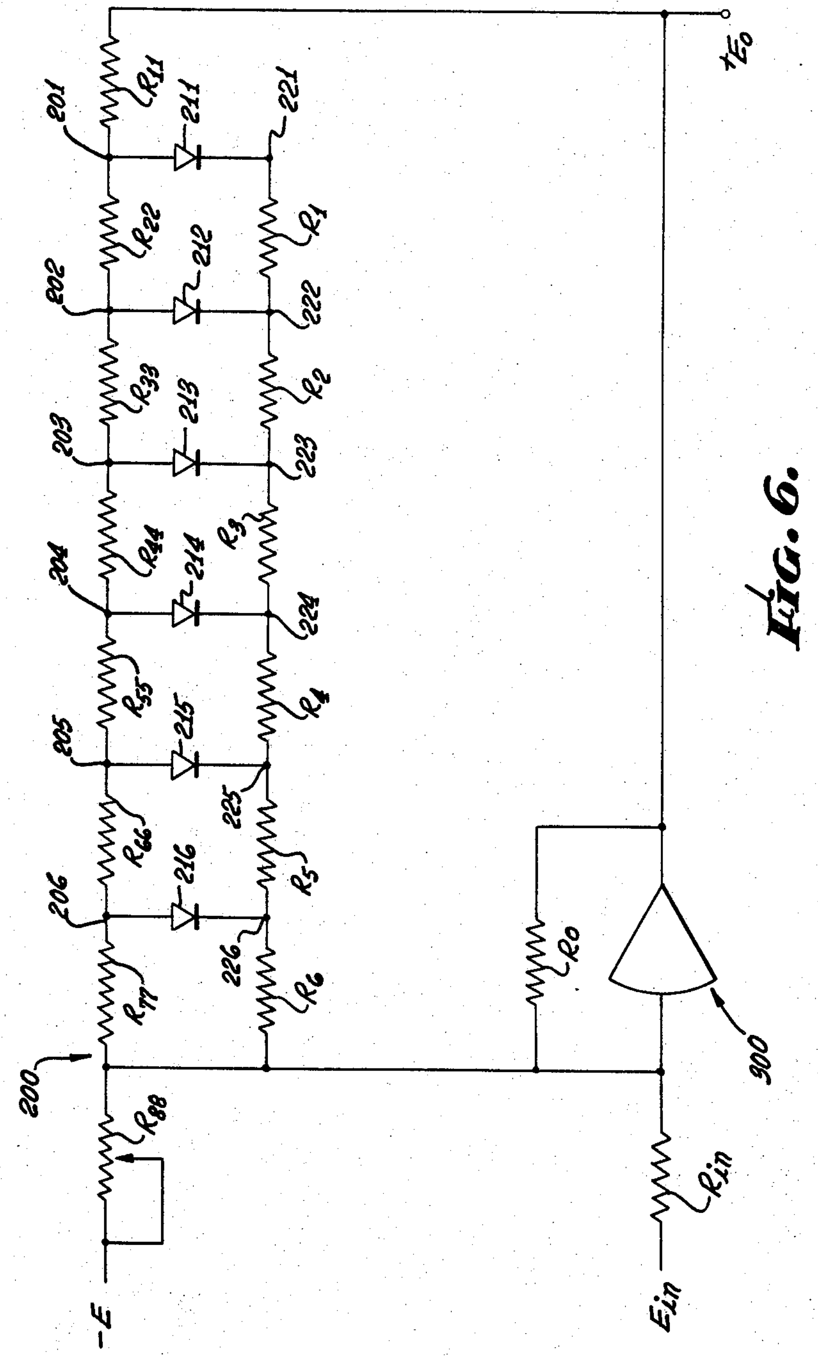

FIG. 5*a* illustrates reduced mismatch between an ideal function to be generated and the straight line segments approximately generated by the FIG. 4 equipment, FIG. 5*b* showing reduced error associated therewith; and FIG. 6 illustrates another form of the invention.

Figure 1:
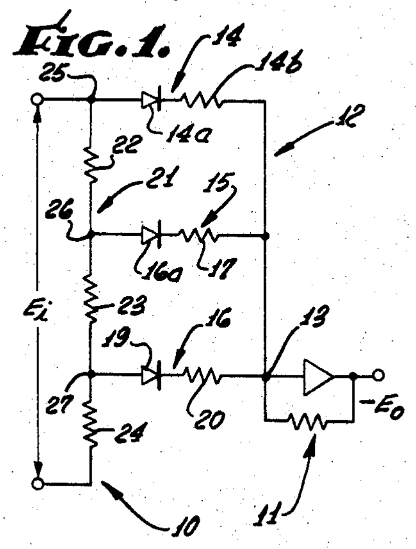

Referring first to FIG. 1, the typical function generator 10 includes an input circuit 12 with channels 14–16 from which input current is summed at junction 13. Channel 14 includes diode **14*a* and resistance 14*b*, channel 15 includes diode 16*a* and resistance 17, and channel 16 includes diode 19 and resistance 20. Input voltage $E_i$ is applied across voltage divider 21 and that includes resistance segments 22–24, and the channels 14–16 have connection to the divider at points 25–27**.

Referring to FIG. 2*a*, the ideal function to be generated may for example be represented by the square law curve 28 having ordinates $-E_o$ (due to phase inversion produced by the operational amplifier 11 connected to junction 13) with magnitude equal to $E_i^2$ where $E_i$ is the input voltage and $-E_o$ is the generator output voltage. A portion of the curve may be approximated by the straight line segments 30, 31 and 32 having different slopes and intersecting at break-points 33 and 34. In the interval $E_{i_0}$ to $E_{i_1}$, the output $-E_o$ increases along segment 30, diodes 16 and 19 being biased so as not to conduct and **14*a* conducting; in the interval $E_{i_1}$ to $E_{i_2}$ the output $-E_o$ increases along segment 31, diode 16 now conducting, but diode 19 remaining non-conductive; and finally in the next interval beyond $E_{i_2}$, the output $-E_o$ increases along the segment 32**, all diodes now conducting. FIG. 2*b* indicates the ordinate error associated with mismatch between curve 28 and segments 30, 31 and 32, the error "humps" being indicated at **30*a*, 31*a* and 32*a*. Note that error of opposite polarity (indicated at 70 and 71**) will be a function of the rounding characteristics of the diode means, the latter not being an ideal device. This rounding is such as to decrease the overall peak to peak error. To decrease the amplitude of such error "humps," it has previously been thought necessary to increase the number of diodes in FIG. 1; however, in accordance with the principles of the present invention such an expedient is not necessary and can be avoided.

Figure 3:
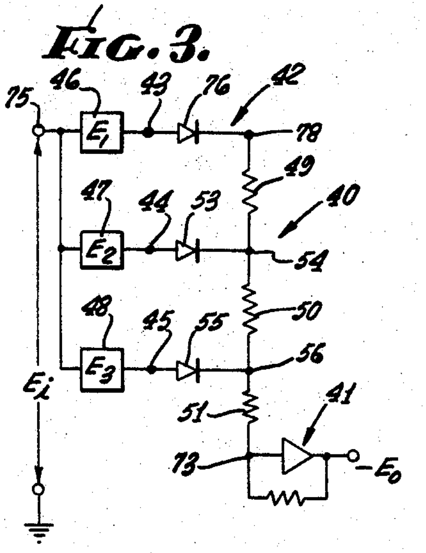
FIG. 3 shows an improved function generator employing the invention.

Turning to FIG. 3, it shows a function generator 40 having input circuit means 42 to a reference point 73 (that may be connected to operational amplifier 41). The input circuit means 42 includes terminal means at which different input voltages are impressed, illustrative of which are the terminals 43, 44 and 45 and the sources 46–48 of biasing voltage. Input voltage is applied to terminal 75. The input circuit means also includes resistance connected in series in an input path to the point 73, and typically such resistance may include resistance sections as are indicated at 49, 50 and 51.

Finally, the input circuit means includes diode means connected between the terminal means and the input path intermediate sections of resistance therein. Such diode means may for example include diode 76 connected between terminal 43 and point 78; diode 53 connected between terminal 44 and the point 54 that is intermediate resistance sections 49 and 50; and such diode means may include diode 55 connected between terminal 45 and the point 56 that is intermediate resistance sections 50 and 51; however, the diode means will include at least one and usually two diodes, such as 53 and 55, that are respectively connected between resistance spaced points of the input path.

Referring to FIG. 4, the components thereof that are the same as in FIG. 3 are given the same numbers. The principal difference in FIG. 4 is the use of a voltage divider 60 in the input circuit, in place of sources 46–48, a biasing potential being provided at 90. Divider 60 includes primary resistance sections 61, 62 and 63 having resistance spaced points 64, 65 and 66 to which the diodes 53, 55 and 76 are respectively connected. In this regard, resistance sections 49, 50 and 51 may be considered as secondary resistance. The resistance section 49 is connected to point 66 of the divider via diode 76. Points 64–66 are of course at different potentials and may be considered as one form of terminal means at which different bias voltages are impressed. In operation, both sides of the diodes are biased in an unequal manner relative to the input voltage $E_i$. Also, the change of voltage across a diode relative to the change of input voltage $E_i$ can be adjusted to any desired value within a selected range, by resistor selection. Thus the diode rounding characteristic can be made to extend over a greater range of the input voltage as seen at 100 in FIG. 5*b*, as compared to range 101 in FIG. 2*b*.

One advantage of the FIG. 4 generator, over the generator of FIG. 1, lies in its ability to greatly reduce such error as is illustrated at 110 and 111 in FIG. 5*b*, with rounding off of the break-point. See in this regard the rounding off at 104 (and within range 100) of segments 105 and 106 in FIG. 5*a*, the ideal curve being indicated at 107. Another way of comparing the two generators is to consider that whereas the FIG. 1 generator might tolerate no more than .5 volt steps between points 25 and 26 and points 26 and 27, for an acceptable error as seen in FIG. 2*b*, the FIG. 4 generator will give about the same acceptable error with as much as about 10 volt steps between points 66 and 64, and points 64 and 65. Therefore, the overall input-output voltage range is greatly extended in the case of the FIG. 4 generator. A still further advantage is greatly lessened need for expedients such as smoothing oscillators and output averaging filters for rounding out the generator characteristics near the break-points. Of course, adjustable resistors can be used for break-point and slope adjustment in the FIG. 3 and FIG. 4 devices Silicon junction diodes are especially useful in the generator of the invention, due to their characteristics, including temperature drift characteristics.

Referring now to FIG. 6, it illustrates the positive output section 200 of a fixed diode function generator. The section includes a voltage divider having resistances $R_{11}$, $R_{22}$, $R_{33}$, $R_{44}$, $R_{55}$, $R_{66}$, $R_{77}$, and $R_{88}$ which is variable, six break-points being indicated at 201, 202, 203, 204, 205 and 206. Diodes 211, 212, 213, 214, 215 and 216 are connected between the respective break-points and the common junctions 221, 222, 223, 224, 225 and 226 respectively, as shown. A series resistance slope divider that includes resistances $R_1$–$R_6$ is connected with the feedback impedance $R_o$ of the DC operational amplifier 300. Resistance $R_{IN}$ is connected at the input side of the amplifier.

In operation, slope gains are changed at predetermined break-points. Thus, $R_oR_{IN}$ will determine the inital slope or gain, feedback current flowing through $R_o$ only. Upon a sufficient increase in input voltage $E_{in}$, diode 211 will conduct feedback current and the slope $E_o/E_{IN}$ will be determined by the expression:

$$\frac{Z_1R_o}{Z_1+R_o}\cdot\frac{1}{R_{IN}} \qquad (1)$$

where, $$Z_1 \cong R_{11}+Z_{211}+R_1+R_2+R_3+R_4+R_5+R_6 \qquad (2)$$

$Z_{211}$=impedance of diode 211.

Upon a sufficient further increase in input voltage $E_{in}$, diode 212 will conduct feedback current, and the slope $E_o/E_{IN}$ will be determined by the expression $$\frac{Z_2R_o}{Z_2+R_o}\cdot\frac{1}{R_{in}} \qquad (3)$$

where, $$Z_2 \cong R_{11}+R_{22}+Z_{212}+R_2+R_3+R_4+R_5+R_6 \qquad (4)$$

The difference between Equations 2 and 4 is found in the added impedance of resistor $R_{22}$ and diode 212, and neglected impedance of resistor $R_1$ and diode 211. In this case, the effect of feedback current flowing through diode 211 and resistor $R_1$ can be neglected since their impedances are several times the value of $R_{22}$ and connected in parallel with $R_{22}$, resulting in an effective impedance value which is almost equal to $R_{22}$ in Equation 4. The effect is favorable because it extends the rounding effect of the diode 212 by placing an additional bias which makes the effective voltage drop across 212 smaller. Thus, the diode of interest, 212, can be considered as working independently of the diode 211, so that the slope may be considered as produced as a result of the effect of the diode 212 plus the resistances in series with it. The same is true when the other diodes 213–216 conduct feedback current, i.e. when diode 215 is conducting, the effect of diodes 211–214 and resistors $R_1$–$R_4$ can be neglected.

Further, having only one diode effectively working for every slope allows the circuit to make use of the square law conductive characteristics of the diode, i.e. the diode rounding effects discussed above. This is accomplished by selective biasing calculation of the break-points 201 to 206 and slope loading so as to place the diode curve or rounding characteristics (which in effect represent the diode dynamic impedance) in series with the slope resistors.

I claim:

1. In a function generator, a current summing reference point, an operational amplifier having its input electrically connected with said reference point, and input circuit means for said point including a voltage divider, a first diode having one side thereof electrically connected to a first voltage point of the divider, a first resistor connected between the opposite side of the first diode and said reference point, a second diode having one side thereof electrically connected to a second voltage point of the divider, a second resistor connected between the opposite side of the second diode and said opposite side of the first diode, a third diode having one side thereof connected to a third voltage point of the divider, and a third resistor connected between the opposite side of the third diode and said opposite side of the second diode, said first, second and third resistors being connected in series.

2. The combination of claim 1 in which said diodes consist of silicon junction diodes.

3. The combination of claim 1 in which the amplifier output is connected with said divider.

References Cited

UNITED STATES PATENTS

| | | | |
|---|---|---|---|
| 2,900,137 | 8/1959 | Giser | 235—194 |
| 2,976,430 | 3/1961 | Sander | 328—143 XR |
| 3,197,627 | 7/1965 | Lewis | 328—145 XR |

ARTHUR GAUSS, *Primary Examiner.*

J. JORDAN, *Assistant Examiner.*